(12) United States Patent
Froning et al.

(10) Patent No.: US 11,415,171 B2
(45) Date of Patent: Aug. 16, 2022

(54) ROLLING BEARING ARRANGEMENT

(71) Applicants: thyssenkrupp rothe erde Germany GmbH, Dortmund (DE); thyssenkrupp AG, Essen (DE)

(72) Inventors: Stephan Froning, Schwerte (DE); Jan-Peter Bochert, Anröchte (DE)

(73) Assignees: THYSSENKRUPP ROTHE ERDE GERMANY GMBH, Dortmund (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/765,209

(22) PCT Filed: Dec. 4, 2018

(86) PCT No.: PCT/EP2018/083443
§ 371 (c)(1),
(2) Date: May 19, 2020

(87) PCT Pub. No.: WO2019/110566
PCT Pub. Date: Jun. 13, 2019

(65) Prior Publication Data
US 2020/0291993 A1    Sep. 17, 2020

(30) Foreign Application Priority Data
Dec. 6, 2017 (DE) ............ 10 2017 128 949.6

(51) Int. Cl.
*F03D 80/70* (2016.01)
*F16C 19/38* (2006.01)
*F16C 19/28* (2006.01)

(52) U.S. Cl.
CPC ............ *F16C 19/38* (2013.01); *F03D 80/70* (2016.05); *F05B 2240/50* (2013.01);
(Continued)

(58) Field of Classification Search
CPC ...... F16C 19/38; F16C 19/381; F16C 19/383; F16C 19/385; F16C 19/386; F16C 19/388;
(Continued)

(56) References Cited

U.S. PATENT DOCUMENTS 5,074,677 A    12/1991  Andree
9,869,352 B2 *  1/2018  Fujiwara ............... F16D 41/067
(Continued)

FOREIGN PATENT DOCUMENTS

CN    102996369 A    3/2013
CN    103477100 A    12/2013
(Continued)

OTHER PUBLICATIONS

English Translation of International Search Report issued in PCT/EP2018/083443, dated Feb. 13, 2019.

*Primary Examiner* — Alan B Waits
(74) *Attorney, Agent, or Firm* — thyssenkrupp North America, LLC (57) ABSTRACT

A bearing arrangement may be employed in a rotor shaft of a wind turbine. The rotor shaft may transfer rotation of a hub with rotor blades to a generator. The bearing arrangement may include a hub-side rolling bearing and a generator-side rolling bearing. The hub-side rolling bearing may be configured as a radial roller bearing. The generator-side rolling bearing may be configured as a three-row roller rotary connection. The hub-side rolling bearing may include a closed cage with windows for guiding rolling elements. Rows of the closed cage may be separated by a central web. Further, at least one of the generator-side rolling bearing or the hub-side rolling bearing may comprise inductively hardened raceways.

17 Claims, 5 Drawing Sheets

(52) U.S. Cl.
CPC ............ *F16C 19/28* (2013.01); *F16C 19/381* (2013.01); *F16C 2300/14* (2013.01); *F16C 2360/31* (2013.01)

(58) Field of Classification Search
CPC .... F16C 2360/31; F16C 19/28; F16C 35/063; F16C 2226/60; F16C 2226/62; F16C 2240/50; F16C 2300/14; F03D 80/70
See application file for complete search history.

(56) References Cited

U.S. PATENT DOCUMENTS

| | | | | |
|---|---|---|---|---|
| 10,428,801 | B2* | 10/2019 | Fujiwara | F03D 80/70 |
| 10,451,106 | B2* | 10/2019 | Sauter | F16C 17/10 |
| 2010/0215307 | A1* | 8/2010 | Loeschner | F16C 19/381 |
| | | | | 384/571 |
| 2012/0141270 | A1 | 6/2012 | Minadeo | |
| 2014/0023305 | A1* | 1/2014 | Frank | F16C 25/08 |
| | | | | 384/569 |
| 2014/0029882 | A1* | 1/2014 | Palmer | F16C 33/7896 |
| | | | | 384/473 |
| 2016/0146252 | A1* | 5/2016 | von Schleinitz | F16C 33/4682 |
| | | | | 384/574 |
| 2018/0209477 | A1 | 7/2018 | Sauter | |
| 2019/0017496 | A1* | 1/2019 | Wilson | F03D 80/70 |

FOREIGN PATENT DOCUMENTS

| | | | | |
|---|---|---|---|---|
| CN | 108291577 A | | 7/2018 | |
| DE | 39 27 077 A | | 2/1991 | |
| DE | 102007041508 A1 | * | 3/2009 | ............ F16H 57/08 |
| DE | 10 2007 057 045 A | | 5/2009 | |
| DE | 10 2010 005 511 A | | 7/2011 | |
| DE | 20 2011 051 680 U | | 11/2011 | |
| DE | 10 2011 008 958 A | | 7/2012 | |
| DE | 20 2015 006 588 U | | 7/2012 | |
| DE | 10 2015 200 644 A | | 7/2016 | |
| DE | 102017107005 B3 | * | 9/2018 | ............ F16C 33/586 |
| DE | 102017206246 A1 | * | 10/2018 | ............ F16C 33/583 |
| EP | 1741943 A2 | * | 1/2007 | ............ F16C 19/505 |
| EP | 2 871 376 B | | 5/2015 | |
| EP | 2754892 B1 | * | 3/2016 | ............ F03D 13/10 |
| GB | 1431612 A | * | 4/1976 | ............ F16C 33/545 |
| WO | WO-2012084665 A2 | * | 6/2012 | ............ F16H 1/227 |

* cited by examiner

ROLLING BEARING ARRANGEMENT

CROSS REFERENCE TO RELATED APPLICATIONS

This application is a U.S. National Stage Entry of International Patent Application Serial Number PCT/EP2018/083443, filed Dec. 4, 2018, which claims priority to German Patent Application No. DE 10 2017 128 949.6, filed Dec. 6, 2017, the entire contents of both of which are incorporated herein by reference.

FIELD

The present disclosure generally relates to rolling bearings, including rolling bearing arrangements for rotor shafts of wind turbines.

BACKGROUND

The rotor shaft of a wind turbine transmits the rotation of the rotor blades to the generator during operation, wherein the rotation of the rotor, driven by the flowing air, is converted into electrical energy. The rotor shaft can be mounted in the gondola of the wind turbine in different ways. According to a first mounting concept, two bearing points spaced apart from each other in the axial direction of the rotor shaft are provided, wherein a floating bearing is provided at one bearing point, and a fixed bearing is provided at the other bearing point (fixed/floating mounting). According to a second mounting concept, the hub is screwed to the internal gear of a planetary gearbox or, in the case of gearbox-less systems, is screwed directly to the rotor of the generator. In both cases of the second mounting concept, only a single torque bearing is needed to mount the rotor shaft, which bearing, with a low overall height, absorbs axial forces, radial forces and tilting torques and introduces the same into the gondola of the wind turbine. The present invention deals with the first mounting concept described above, in which two rolling bearings, of which one is formed as a floating bearing and the other as a fixed bearing, are provided at a distance from each other in the axial direction of the rotor shaft.

In the fixed/floating mountings known from the prior art, the rotor shaft is arranged substantially horizontally and is rotatably mounted at two supporting points spaced apart axially. The two associated bearings will be designated as a hub-side and generator-side bearing below, depending on their position. The rotatable mounting of the shaft must firstly bear the inherent weight of the shaft itself and that of the hub and rotor blades, secondly most also absorb the loads caused by the wind. Both loadings generate tilting torques and forces in the radial and axial direction in the bearings, wherein the hub-side bearing must bear considerably greater loadings, because of the high weight of the rotor blades. Furthermore, the forces lead to elastic deformations of the rotor shaft. The rolling bearings can be configured such that said elastic deformations of the rotor shaft are compensated by the bearings.

Technical embodiments of such mountings of the rotor shaft are known from the prior art. To this end, the document EP 2 871 376 B1 describes a mounting for a hydrodynamic machine, for example a wind turbine, in which the shaft is rotatably mounted by means of a fixed and a floating bearing. The fixed bearing comprises two self-aligning contact bearings, in which multiple barrel-shaped rolling elements are each arranged with an inclination with respect to the axis of rotation and roll between two curved raceways. Arranged at an axial distance from the fixed bearing is the floating bearing, in which a further set of rolling elements rolls between two curved raceways. By means of the self-aligning toroidal roller bearings, a bearing arrangement is produced which tolerates flexing and alignment errors of the shaft to a high degree. A disadvantage of this arrangement, however, conversely consists in the fact that such a compliant mounting offers only little resistance to load-induced deformations of the shaft. The deformations of the shaft must therefore be absorbed by the generator. Furthermore, the use of a toroidal roller bearing as floating bearing leads to its being able to absorb axial movements of the shaft, for example because of thermal expansion, only to a limited extent.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a bearing arrangement for a rotor shaft of a wind turbine, in which the rotor shaft transfers a rotation of a hub provided with rotor blades to a generator, wherein the bearing arrangement comprises a hub-side rolling bearing and a generator-side rolling bearing.

The present invention is based on the object of intercepting the non-uniform load distribution on the hub-side and the generator-side bearings by means of a suitable configuration of the bearings and of keeping the axial expansion of the shaft low. One technical boundary condition consists in designing the bearings to be operationally reliable for a period of use of more than 20 years and, for this purpose, of keeping the pressures of the contact between the rolling elements and raceways low (in particular less than 1500

MPa for operational loads). An economic and logistic boundary condition consists in limiting the size and weight of the bearings.

This object is achieved by a bearing arrangement for a rotor shaft of a wind turbine, in which the rotor shaft transmits a rotation of a hub provided with rotor blades to a generator, wherein the bearing arrangement comprises a hub-side rolling bearing and a generator-side rolling bearing, wherein the hub-side rolling bearing is formed as a radial roller bearing and the generator-side rolling bearing is formed as a three-row roller rotary connection.

It has surprisingly transpired that the combination according to the invention of these two bearing forms permits optimal adaptation to the respective specific loading situation on the hub side and the generator side. The hub-side rolling bearing primarily bears the weight of the hub and of the rotor blades and is subjected to high radial forces as a result. In order to absorb these forces and at the same time to keep the pressure of the contacts between rolling elements and raceways low, a large rolling element length is advantageous. As a result, the radial forces to be transmitted are distributed over a correspondingly large contact zone, which also results in a lower surface pressure. The generator-side rolling bearing, on the other hand, has to absorb lower radial forces as compared with the hub-side bearing but is instead subjected to additional axial loadings and must transmit these to the connecting construction and thus fix the generator-side end of the shaft with respect to the axial position. As a result of the overhang of the hub with respect to the hub-side supporting point, the weights of hub and rotor blades and also the wind forces generate a tilting torque, which must be absorbed by the bearings and additionally lead to the aforementioned elastic deformations.

In the bearing arrangement according to the invention, a tolerance with respect to specific movements of the shaft is produced by the interplay of hub-side and generator-side bearings, while other movements are effectively suppressed. Thus, the hub-side radial bearing is capable of permitting axial movements of the shaft, while radial displacements, for example caused by bending moments, are suppressed by the radial bearing and the corresponding loadings are instead introduced into the connecting construction via the bearings. The generator-side roller rotary connection passes on both radial and axial loads, so that the shaft is fixed in the axial direction at the generator-side end in this way. In order that the hub-side and the generator-side bearing can advantageously interact in such a way, it is necessary that the absorption capacities of both bearings for the movements of the shaft are matched to each other. With the document EP 2 871 376 B1 cited above as a starting point, for example merely replacing the floating bearing by a cylindrical roller bearing would rather lead to a worsening of the interplay between floating and fixed bearings, since the high flexibility of the fixed bearing permits movements of the shaft which, in the floating bearing, can lead to inclinations which cannot be absorbed by a cylindrical roller bearing, and to high pressures or even "edge runners". This leads to unacceptably high wear. Therefore, it is expressly the interaction according to the invention of the two bearings which achieves the desired technical effect (tolerance of certain movements of the rotor shaft while simultaneously ensuring a service life expectation of at least 20 years, required for rotor bearings of wind turbines).

In order to describe the arrangement of the rolling elements and the resultant radial and axial loading relationships, it is expedient to consider the pressure angle of the rolling bearings. Each rolling element is in contact with the raceways of both bearing rings at at least two opposite points. These two points define a pressure line, that is to say the line along which the rolling element transmits compressive forces between the two rings. The angle enclosed by the pressure line with the radial plane of the bearing is designated as the pressure angle and, for a pure radial bearing, lies in the vicinity of 0° and, for a pure axial bearing, in the vicinity of 90°. For the hub-side rolling bearing according to the invention, the transmission of radial forces is decisive, so that the pressure angle in this bearing is chosen to be as small as possible, but at least less than 45°. On the other hand, the generator-side bearing must also absorb higher axial forces which, according to the invention, is achieved by a three-row roller rotary connection. In the roller rotary connection, the axial and radial forces are each absorbed by different rolling element rows. The pressure lines of radially arranged rolling element rows point substantially radially outward and, accordingly, transmit only radial forces. The pressure lines of the axially arranged rolling element rows are, on the other hand, parallel to the axis of rotation and transmit only the axial forces. The embodiments of the hub-side and the generator-side bearing which are described below can each be combined with one another.

According to a preferred embodiment of the invention, the generator-side rolling bearing is formed as a three-row roller rotary connection. Here, the radial and axial forces are transmitted by different rollers. In two rows, the rolling elements are arranged such that the associated pressure lines are substantially perpendicular to the radial plane (pressure angle 90°), while the pressure lines of the rolling elements of the third row lie in the radial plane (pressure angle 0°). The first-named rows having the pressure lines perpendicular to the radial plane absorb axial forces in an optimum way, while the third row having the pressure lines pointing in the radial direction transmits radial forces. This bearing arrangement is distinguished by a relatively low stiffness and high load-bearing ability.

According to a further preferred embodiment of the invention, the hub-side rolling bearing is formed as a cylindrical roller bearing. This bearing form is advantageously particularly suited to bear the high radial roads and, moreover, is capable of absorbing axial displacements, e.g. in the form of an expansion of the shaft caused by temperature change. Furthermore, cylindrical rolling elements, in particular as compared with spherical rolling element forms, have a lower susceptibility to slippage which, in particular under high loads, reduces the wear caused thereby.

According to a preferred embodiment of the invention, the hub-side rolling bearing is formed as a multi-row radial roller bearing. The rollers of the different rows have pressure lines which lie substantially in the radial plane, so that radial forces are transmitted in an optimum way. In order to avoid high pressures between the rolling elements and the raceways, it is necessary that contact surfaces as large as possible should be formed between them. Instead of implementing such contact surfaces by means of correspondingly long rolling elements, in the embodiment according to the invention multi-row bearings are used. These likewise have a large overall contact surface distributed over multiple rows but, in addition, have the advantage that the effective inclination of the rolling elements is lower. As a result, it is advantageously possible to avoid the elevated local contact pressures associated with inclinations, so that the material wear is reduced and the service life is increased. According to a particularly preferred embodiment, the hub-side rolling bearing is in particular formed as a double-row roller bearing.

According to a preferred embodiment, the rolling elements are guided by using a closed cage. The following descriptions of these cage guides constitute equivalent possible embodiments of the hub-side rolling bearing and of the generator-side rolling bearing.

According to a preferred embodiment, the rolling elements are guided in windows of the closed cage. By means of the guidance, uniform distances between adjacent rolling elements are ensured, so that in this way adjacent rolling elements are in particular prevented from touching. Furthermore, a uniform distribution of the loading is advantageously achieved as a result. Rolling elements which, as they revolve, are temporarily not subjected to any loading are guided along in the cage windows without any sliding movements or inclinations occurring.

According to a further preferred embodiment, the rolling elements are guided in a pin cage. For this purpose, the rolling elements have holes into which pins fixed laterally to the cage are introduced, so that the position and alignment of the rolling elements are guided in a controlled manner with little play. As a result, the rolling elements can advantageously be arranged closely following one another without there being the danger that they touch or jam one another as they revolve.

In the multi-row embodiments, it is preferably possible, according to the invention, that the rolling elements of adjacent rows are separated by a central web of the cage. This advantageously prevents the rolling elements touching at their end faces or jamming one another as a result of inclinations.

According to a further preferred embodiment of the invention, the generator-side rolling bearings and/or the hub-side rolling bearings have inductively hardened raceways. Since both the hub-side and the generator-side bearings are subjected to high loads, as the rolling elements roll, cyclic elastic deformations of the rolling elements and raceways occur. In order to prevent plastic deformation work beyond these elastic processes being expended, which over time leads to fatigue and ultimately to damage to the material, the raceways are hardened by an inductive process. Firstly, the plastic deformability of the raceways is reduced sharply and, secondly, abrasion which allows the material to wear is reduced, Inductive hardening processes have the advantage that the heat is produced directly in the material and does not have to penetrate into the material only by thermal conduction, starting from the surface. Furthermore, in this way, a high level of heating can be performed in a very short time.

According to a further preferred embodiment, the generator-side rolling bearing has integrated bearing gap seals. As a result, it is advantageously possible that, firstly, an escape of lubricant from the bearing is prevented and, secondly, the seal prevents contaminants or foreign bodies getting into the bearing and leading to damage there.

According to a further preferred embodiment, the bearing arrangement additionally comprises at least one hub-side hydrostatic element and in particular a sliding bearing. The listed embodiments of the bearing arrangement according to the invention can be combined with hydrostatic elements, which additionally support the hub-side bearing and effect a reduction in the hub-side radial forces. Such a reduction can be provided, for example, by a hydrostatic sliding bearing. In this bearing type, the two rings rotatably mounted relative to each other are separated by a liquid film, so that the rings slide with respect to each other with little friction during the rotation. As opposed to hydrodynamic bearings or lubricating rolling bearings, the liquid film separating the bearing rings is permanently present and, even at low rotational speeds or when at a standstill, can transmit forces between the bearing rings, so that the wear of the rolling bearing is reduced and the service life of the bearing arrangement is increased.

According to a preferred embodiment of the invention, the hub-side rolling bearing is formed as a floating bearing and the generator-side rolling bearing as a fixed bearing.

Figure 1:
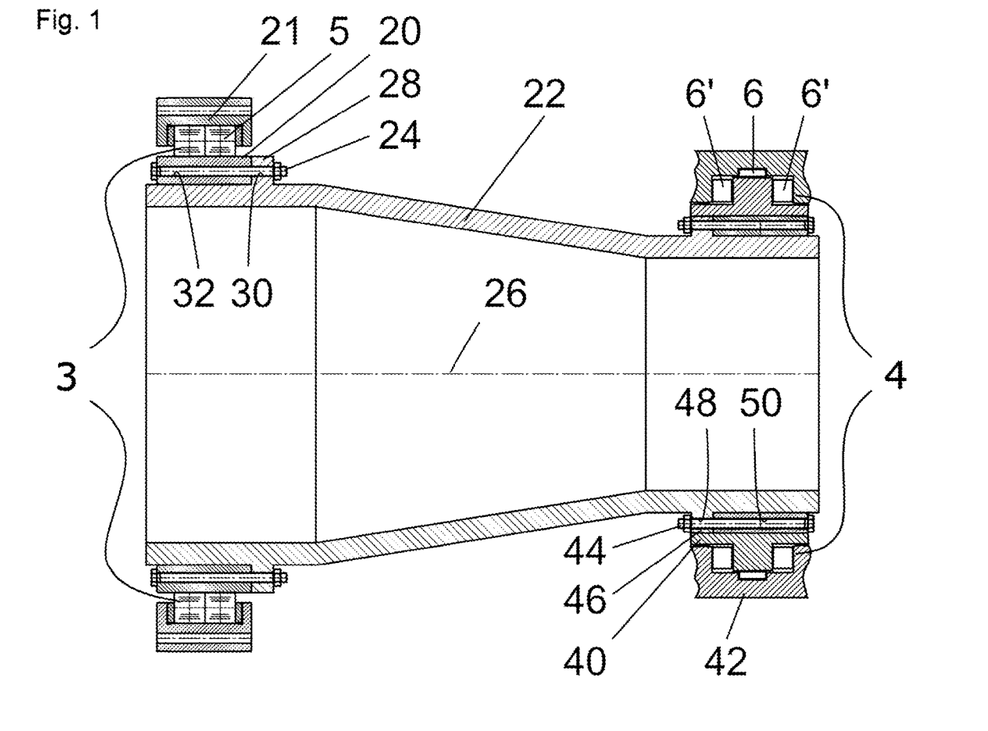
FIG. 1 is a schematic view of an example bearing arrangement for a rotor shaft of a wind turbine.

FIG. 1 depicts, schematically, a bearing arrangement for the rotor shaft of a wind turbine according to a possible design of the invention in a radial sectional illustration. In the wind turbine, the hub is connected to the generator via a rotor shaft, by which means the rotation of the hub is transmitted to the generator and is converted into electrical energy there. According to the invention, the shaft is rotatably mounted by means of two rolling bearing arrangements 3 and 4. According to their position relative to hub and generator, the two rolling bearing arrangements 3 and 4 are designated as a hub-side bearing 3 and as a generator-side bearing 4. In the drawing, the hub side corresponds to the left-hand side and the generator side to the right-hand side.

In this embodiment, the hub-side bearing 3 is formed by two rows of cylindrical rollers 5, which roll between the two bearing rings during the rotation. The cylindrical rolling elements transmit the forces between the two bearing rings substantially in the radial direction and are thus optimally suitable to absorb the high radial forces which are produced by the weight of the hub and the rotor blades.

The generator-side rolling bearing 4 in this embodiment is formed by a three-row roller rotary connection. The roller rotary connection comprises three rows of cylindrical rolling elements, of which one roller element row transmits forces in the radial direction, while two further rolling element rows transmit forces in the axial direction.

Figure 2:
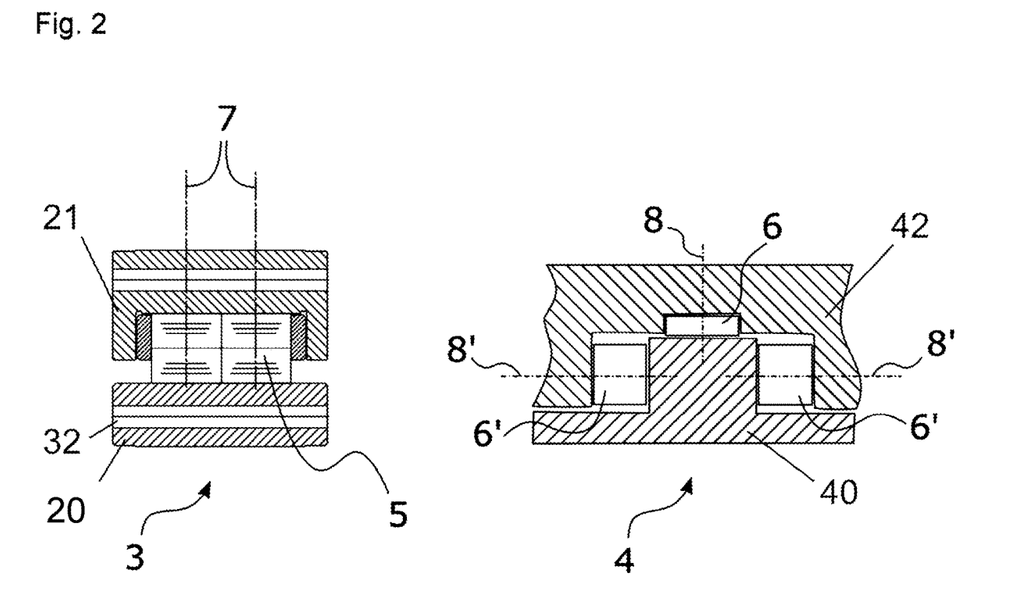
FIG. 2 is a schematic view of an example hub-side rolling bearing and an example generator-side rolling bearing.

FIG. 2 illustrates, schematically, a hub-side rolling bearing 3 and a generator-side rolling bearing 4 according to a possible embodiment of the invention. Both rolling bearings 3 and 4 are illustrated in a radial section, wherein, in comparison to FIG. 1, only the upper of the two sectional surfaces is depicted in each case, and the lower sectional surfaces are located symmetrically with respect to the axis of rotation, mirrored in the opposite position of the respective rolling bearing.

The hub-side bearing 3 in this embodiment is formed by two rows of cylindrical rollers 5 or "rolling elements" which, during the rotation, roll between an inner bearing ring 20 and an outer bearing ring 21. In the unloaded state, each roller 5 forms line contacts at two mutually opposite points. The loading is transmitted from one contact to the opposite contact by a stress curve in the interior of the rolling element. As a result of the position and shape of the rolling elements 5, the bearing 3 illustrated is substantially a pure radial bearing, so that the stresses between the contacts run substantially radially, and the associated pressure lines 7 likewise point in the radial direction. Further, the inner bearing ring 20 may be attached to the rotor shaft 22 via fasteners 24 that extend parallel to a longitudinal axis 26 of the rotor shaft 22 and are disposed about a circumference of the rotor shaft 22. The rollers 5 of the rows of the radial roller bearing 3 have a collective length measured parallel to the longitudinal axis 26 of the rotor shaft 22, and the fasteners 24 may extend farther in a direction that is parallel to the longitudinal axis 26 than the collective length of the rollers 5. The same may be true in examples where the radial roller bearing includes a single row of rollers. Still further yet, the rotor shaft 22 may include a first radial protrusion 28 with an axial abutment surface for abutting the inner bearing ring 20. The fasteners 24 may be anchored in the first radial protrusion 28. Axially extending through-holes 30, 32 can be provided in the first radial protrusion 28 and the inner bearing ring 20 of the hub-side rolling bearing 3. In some examples, the fasteners 24 may be configured as bolts and may extend through the axially extending through-holes 30, 32 to attach the hub-side rolling bearing 3 to the first radial protrusion 28.

The generator-side rolling bearing 4 in this embodiment is formed by a roller rotary connection 4. Here, the transmission of force between the two bearing rings is provided by three rows of cylindrical rolling elements 6, 6'. In the first row, the cylindrical rolling elements 6 are arranged parallel to the axis of rotation and roll between two radially spaced raceways of an inner bearing ring 40 and an outer bearing ring 42. Two further rows of cylindrical rolling elements 6', on the other hand, are arranged perpendicular to the axis of rotation and each roll on two axially spaced raceways of the two bearing rings 40, 42. In the drawing, in addition the pressure lines 8, 8' of all the rolling elements 6, 6' are depicted. The pressure lines 8 of the rolling elements 6 of the first row point in the radial direction and represent the main transmission direction of the first rolling element row 6, which transmits radial forces between the two bearing rings. The pressure lines 8' of the two other rolling element rows, on the other hand, run parallel to the axis of rotation and represent the main transmission direction of the rolling elements 6'. As a result of the combination of purely axial and purely radial pressure lines 8, 8', the roller rotary connection 4 can advantageously absorb forces in both directions and is therefore not only capable of bearing the weight of the rotor shaft 22 but also intercepts the axial forces of the shaft and thus prevents said forces being transmitted to the generator. Further, the inner bearing ring 40 may be attached to the rotor shaft 22 via fasteners 44 that extend parallel to the longitudinal axis 26 of the rotor shaft 22 and are disposed about a circumference of the rotor shaft 22. The rollers 6, 6' of the roller rotary connection 4 may have a collective length measured parallel to the longitudinal axis 26 of the rotor shaft 22, and the fasteners 44 may extend farther in a direction that is parallel to the longitudinal axis 26 than the collective length of the rollers 6, 6'. What's more, the rotor shaft 22 may include a second radial protrusion 46 with an axial abutment surface for abutting the inner bearing ring 40. The fasteners 44 may be anchored in the second radial protrusion 46. Axially extending through-holes 48, 50 can be provided in the second radial protrusion 46 and the inner bearing ring 40 of the generator-side rolling bearing 4. In some examples, the fasteners 44 may be configured as bolts and may extend through the axially extending through-holes 48, 50 to attach the generator-side rolling bearing 4 to the second radial protrusion 46.

Figure 3:
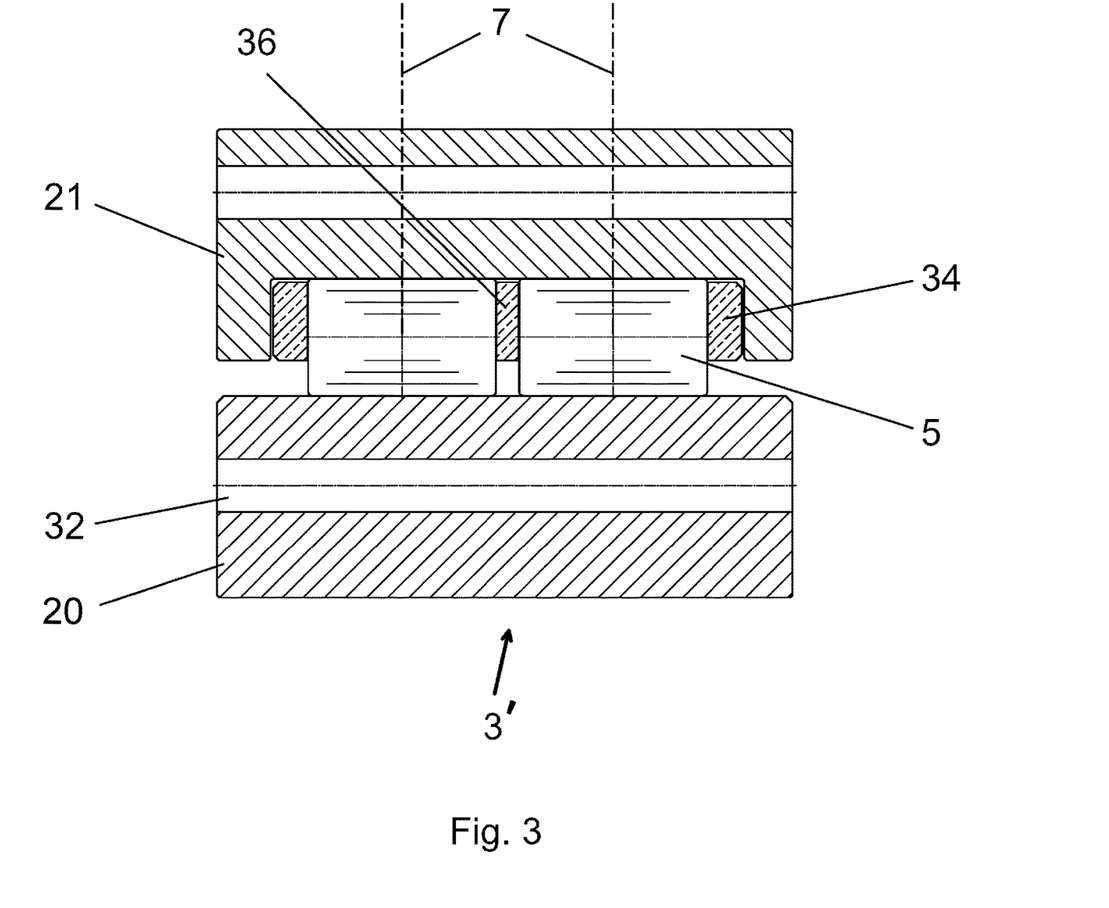
FIG. 3 is a schematic cross-sectional view of an example hub-side rolling bearing that includes a closed cage with rows of rolling elements separated by a central web.
Figure 4:
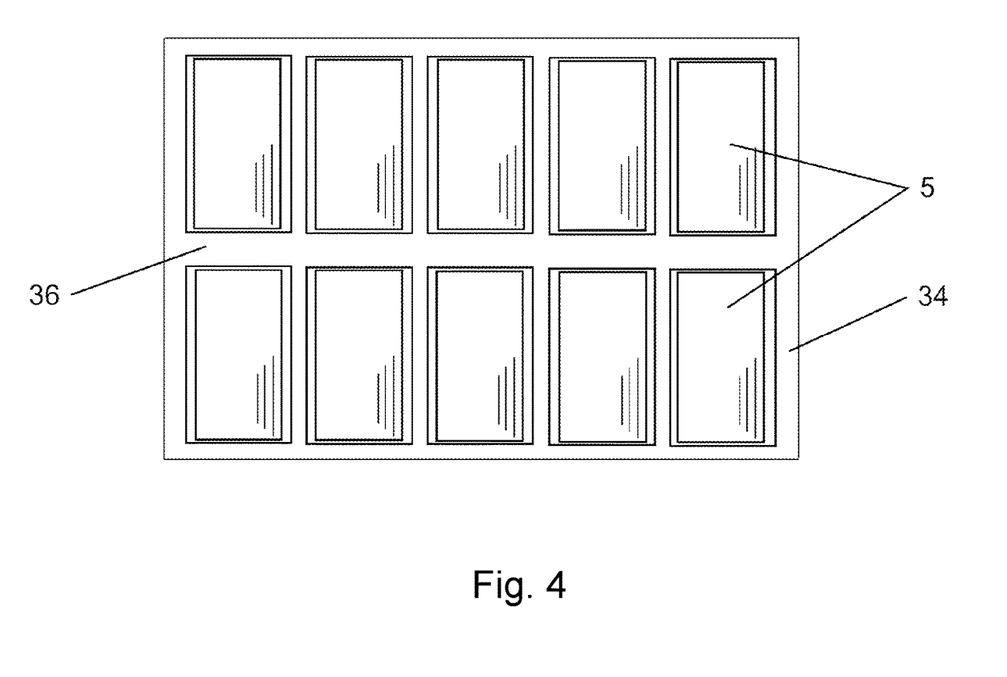
FIG. 4 is a top view of the example closed cage shown in FIG. 3.

FIG. 3 shows another example hub-side rolling bearing 3' in cross section. The hub-side rolling bearing 3' in FIG. 3 includes an example closed cage 34 for guiding the rolling elements 5. In particular, the closed cage 34 includes a central web 36 that separates multiple rows of the rolling elements 5 and that forms "windows" in the closed cage 34 for guiding the rolling elements 5. The example closed cage 34 with the rolling elements 5 are shown in isolation in FIG. 4. As opposed to open cages, which have a comb-like shape, closed cages have windows that frame each rolling element and form a closed loop around a periphery of one or more rolling elements. Those having ordinary skill in the art will appreciate that in some examples the generator-side rolling bearing may also include such a closed cage with a central web.

Figure 5:
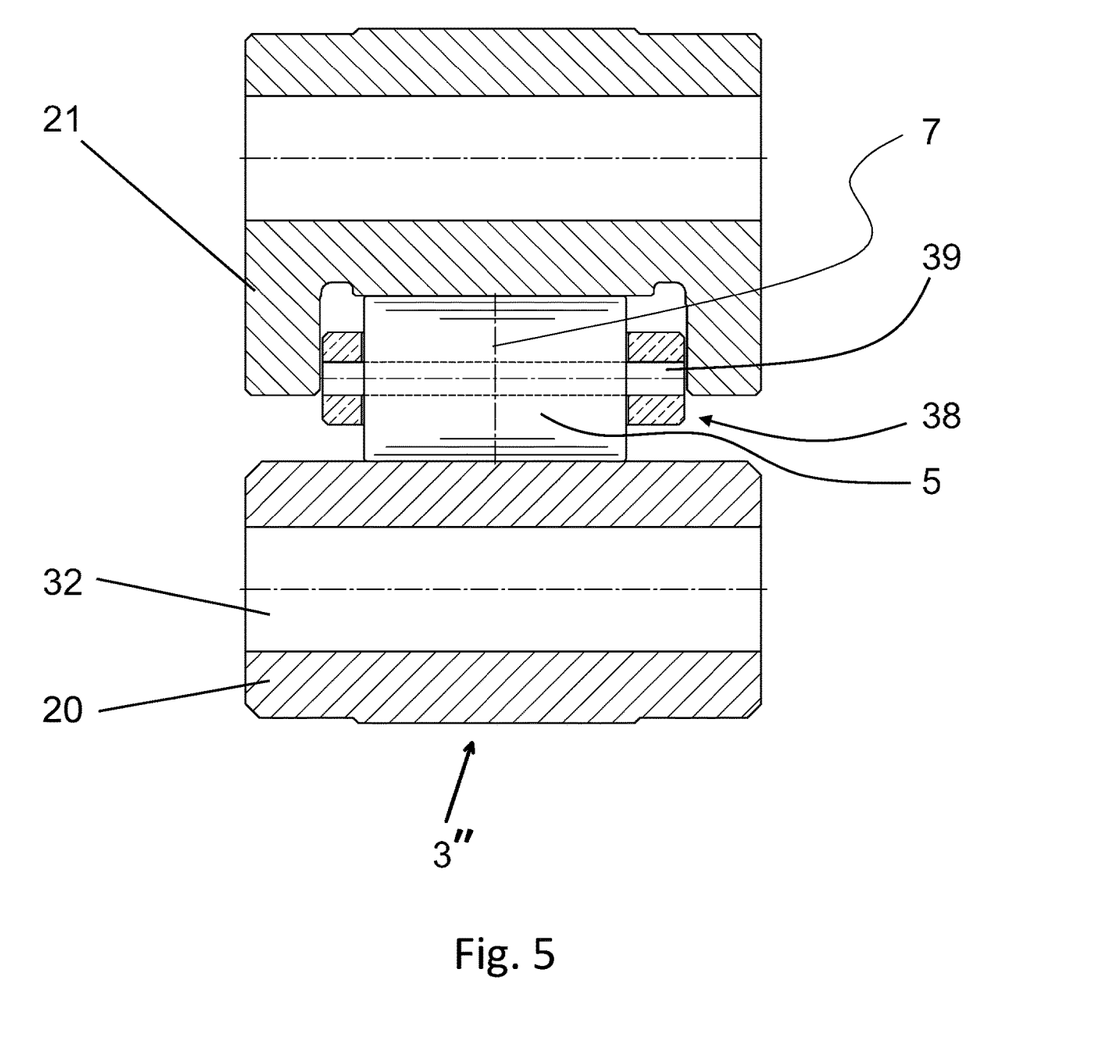
FIG. 5 is a schematic cross-sectional view of an example hub-side rolling bearing that includes a pin cage with pins that guide rolling elements.

FIG. 5 shows still another example hub-side rolling bearing 3" in cross section. The example hub-side rolling bearing 3" in FIG. 4 includes a pin cage 38 with pins 39 that guide the rolling elements 5. Those having ordinary skill in the art will appreciate that in some examples the generator-side rolling bearing may also include such a pin cage.

Figure 6:
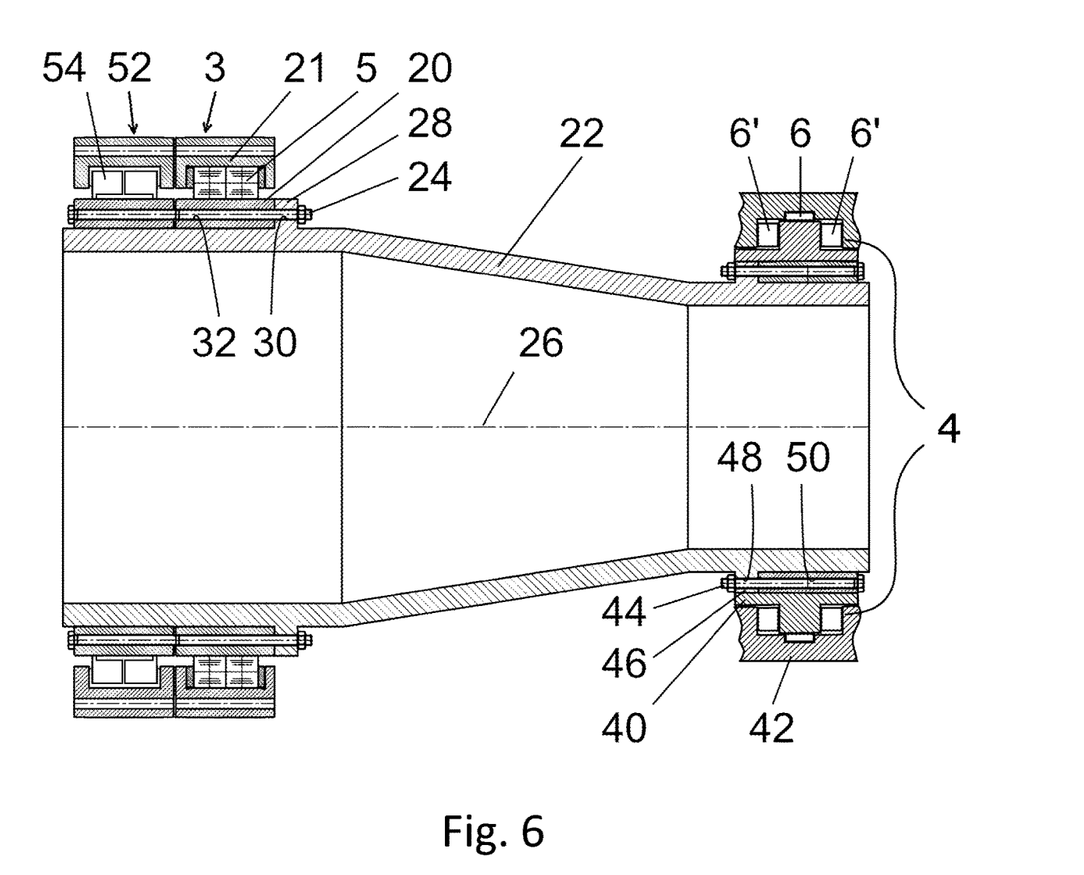
FIG. 6 is a schematic view of another example bearing arrangement for a rotor shaft of a wind turbine.

FIG. 6 depicts, schematically, another example bearing arrangement similar to that shown in FIG. 1. However, the bearing arrangement in FIG. 6 includes a hub-side sliding bearing 52 that includes hydrostatic elements 54 that help support the rotor shaft 22 by being pressed hydrostatically against an inner ring of the hub-side sliding bearing 52.

LIST OF DESIGNATIONS 3, 3', 3" Hub-side rolling bearing
4 Generator-side rolling bearing
5 Rolling element of the hub-side rolling bearing
6 Radially arranged rolling element of the generator-side rolling bearing
6' Axially arranged rolling element of the generator-side rolling bearing
7 Pressure lines of the hub-side rolling bearing
8 Radial pressure lines of the generator-side rolling bearing
8' Axial pressure lines of the generator-side rolling bearing
21 Outer bearing ring
22 Rotor shaft
24 Fasteners
26 Longitudinal axis
28 First radial protrusion
30 Axially-extending through-hole
32 Axially-extending through-hole
34 Closed cage
36 Central web
38 Pin cage
39 Pins
40 Inner bearing ring
42 Outer bearing ring
44 Fasteners
46 Second radial protrusion
48 Axially-extending through-hole
50 Axially-extending through-hole
52 Hub-side sliding bearing
54 Hydrostatic elements

What is claimed is:

1. A bearing arrangement for a rotor shaft of a wind turbine, wherein the rotor shaft transfers rotation of a hub with rotor blades to a generator, the rotor shaft extending along and being rotatable about a longitudinal axis, the bearing arrangement comprising:
   a hub-side rolling bearing configured as a radial roller bearing; and
   a generator-side rolling bearing configured as a three-row roller rotary connection,
   wherein the hub-side rolling bearing and the generator-side rolling bearing each comprise an inner ring, an outer ring, and rolling elements disposed between the inner ring and the outer ring, wherein the inner ring of each of the hub-side rolling bearing and the generator-side rolling bearing is attached to the rotor shaft via fasteners that extend parallel to a longitudinal axis of the rotor shaft and are disposed about a circumference of the rotor shaft,
   wherein the rotor shaft comprises a first radial protrusion with a first axial abutment surface for abutting the inner ring of the hub-side rolling bearing, wherein the fasteners of the hub-side rolling bearing are anchored in the first radial protrusion,
wherein the rotor shaft comprises a second radial protrusion with a second axial abutment surface for abutting the inner ring of the generator-side rolling bearing, wherein the fasteners of the generator-side rolling bearing are anchored in the second radial protrusion,
wherein the first and second radial protrusions are disposed, respectively, on sides of the hub- and generator-side bearings that are longitudinally closest to a midpoint of a longitudinal extent of the rotor hub.

2. The bearing arrangement of claim 1 wherein the hub-side rolling bearing is configured as a multi-row roller bearing.

3. The bearing arrangement of claim 1 the hub-side rolling bearing is configured as a double-row roller bearing.

4. The bearing arrangement of claim 1 wherein the hub-side rolling bearing is configured as a cylindrical roller bearing.

5. The bearing arrangement of claim 1 wherein at least one of the generator-side rolling bearing or the hub-side rolling bearing comprises inductively hardened raceways.

6. The bearing arrangement of claim 1 comprising a hub-side hydrostatic element configured as a hydrostatic sliding bearing that includes two bearing rings that are separated permanently by a liquid film.

7. The bearing arrangement of claim 1 wherein the hub-side rolling bearing is configured as a floating bearing, wherein the generator-side rolling bearing is configured as a fixed bearing.

8. The bearing arrangement of claim 1 wherein the rollers of the radial roller bearing have a length measured parallel to the longitudinal axis of the rotor shaft, wherein the fasteners extend farther in a direction that is parallel to the longitudinal axis than the length of the rollers.

9. The bearing arrangement of claim 1 wherein axially extending through-holes are provided in the first radial protrusion and the inner ring of the hub-side rolling bearing, wherein the fasteners are configured as bolts and extend through the axially extending through-holes to attach the hub-side rolling bearing to the first radial protrusion.

10. The bearing arrangement of claim 1 wherein axially extending through-holes are provided in the second radial protrusion and the inner ring of the generator-side rolling bearing, wherein the fasteners are configured as bolts and extend through the axially extending through-holes to attach the generator-side rolling bearing to the second radial protrusion.

11. The bearing arrangement of claim 1 wherein the radial protrusion extends radially to a same extent as the inner ring of the at least one of the hub-side rolling bearing or the generator-side rolling bearing.

12. The bearing arrangement of claim 1 wherein the hub-side bearing is configured to absorb axial displacement of the rotor shaft.

13. The bearing arrangement of claim 1 wherein the rotor shaft extends along and is rotatable about a longitudinal axis, wherein the hub-side bearing is disposed at a first distal end of the rotor shaft such that a longitudinal extent of the hub-side bearing is greater than a longitudinal distance between the first distal end of the rotor hub and the hub-side bearing.

14. The bearing arrangement of claim 13 wherein the generator-side bearing is disposed at a second distal end of the rotor shaft such that a longitudinal extent of the generator-side beading is greater than a longitudinal distance between the second distal end of the rotor hub and the generator-side bearing.

15. The bearing arrangement of claim 1 wherein a pressure angle of they hub-side rolling hearing is less than 45 degrees.

16. The bearing arrangement of claim 1 wherein the generator-side bearing has integrated bearing gap seals.

17. The bearing arrangement of claim 1 wherein the hub-side rolling beating is configured to bear a majority of a weight of the rotor shaft and rotor blades, wherein raceways and rolling elements of the hub-side rolling bearing and of the generator-side rolling bearing are sized and shaped such that contact pressure between the rolling elements and the raceways is less than 1500 MPa during operation of the bearing arrangement.

* * * * *